US012262848B2

United States Patent
Yeh (10) Patent No.: US 12,262,848 B2
(45) Date of Patent: Apr. 1, 2025

(54) ROCKER ARM STRUCTURE OF HAND-OPERATED BEAN GRINDER

(71) Applicant: Chuang-Kang Machinery Technology Co., Ltd, New Taipei (TW)

(72) Inventor: Hsiang-Chen Yeh, New Taipei (TW)

(73) Assignee: CHUANG-KANG MACHINERY TECHNOLOGY CO., LTD, New Taipei (TW)

( * ) Notice: Subject to any disclaimer, the term of this patent is extended or adjusted under 35 U.S.C. 154(b) by 263 days.

(21) Appl. No.: 17/990,762

(22) Filed: Nov. 21, 2022

(65) Prior Publication Data

US 2024/0122407 A1    Apr. 18, 2024

(30) Foreign Application Priority Data

Oct. 17, 2022  (TW) .................................. 111211290

(51) Int. Cl.
*A47J 42/46*        (2006.01)

(52) U.S. Cl.
CPC ..................... *A47J 42/46* (2013.01)

(58) Field of Classification Search
CPC .. A47J 42/46; A47J 42/04; A47J 42/14; A47J 42/24; A47J 42/34
See application file for complete search history.

(56) References Cited

U.S. PATENT DOCUMENTS

2014/0312152 A1* 10/2014 Pai .......................... A47J 42/46
                                                                241/169.1
2018/0279829 A1* 10/2018 Kanazawa .............. A47J 42/46

FOREIGN PATENT DOCUMENTS

DE        202019107282 U1 *  3/2020

OTHER PUBLICATIONS

English translate (DE202019107282U1), retrieved date Sep. 9, 2024.*

* cited by examiner

*Primary Examiner* — Mohammed S. Alawadi
(74) *Attorney, Agent, or Firm* — Leong C. Lei (57) ABSTRACT

A rocker arm structure of a hand-operated bean grinder includes a crank rocker arm and a folding mechanism. The crank rocker arm has first and second sections of rod body, and the folding mechanism is assembled between the first and second sections of rod body. The folding mechanism includes a first and second bodies assembled with each other. A spring is assembled between the first and second rod bodies, and a guide rail seat and a guide pin are respectively arranged on the first and second bodies. The guide rail seat is arranged on the second assembly port, and is arranged with a guide rail, a positioning groove, and at least one assembly notch. The guide rail has a position for guiding the first section of rod body to rotate 180 degrees from the position to be ground.

10 Claims, 11 Drawing Sheets

ROCKER ARM STRUCTURE OF HAND-OPERATED BEAN GRINDER

The invention relates to a rocker arm structure, and more particularly to a rocker arm structure of a hand-operated bean grinder, which is assembled on the hand-operated bean grinder and can provide convenient storage effects.

BACKGROUND OF THE INVENTION

People who enjoy drinking coffee should know that hand grinder ought to be the most influential factor in deciding the intensity of flavor of personal choice. Nowadays, the hand-operated bean grinder has been continuously developed and improved, both in function and appearance, along with the personalized needs and cleaning and maintenance after use. As far as the power mechanism in the bean grinder is concerned, the rocker arm used to provide hand grinding operations has evolved from the simple straight rod type in the early stage to the current crank type, which not only gets rid of monotony in appearance, but also provides more ergonomic requirements in function. However, the crank-type rocker has a long longitudinal volume due to its multi-tortuous rod body, where one end must be combined with a joint member to connect with the hollow shell of the bean grinder, while the other end must be combined with a grip for hands to operate without failure. The joint member, grip and the crank-type rod body are set in different directions, so that the volume of the whole crank-type rod body plus the joint member and the grip is longer, and the asymmetric shapes in different directions make the volume fluctuate, resulting in the needs for increasing the packaging in storage.

SUMMARY OF THE INVENTION

The purpose of the present invention is to provide a rocker arm structure of a hand-operated bean grinder. The rocker arm is crank-shaped, and a folding mechanism is arranged on the crank-shaped rocker arm, so that asymmetric longitudinal bodies with different orientations can be folded into a small volume symmetrical in the same orientation, and the effect of small volume storage can be arranged.

In order to serve the above purposes, the rocker arm structure of the hand-operated bean grinder of the present invention comprises: a crank rocker arm and a folding mechanism. The crank rocker arm is arranged with a first section of rod body and a second section of rod body, one end of the first section of rod body is assembled with a grip, and one end of the second section of rod body is assembled with a joint member. The folding mechanism comprises a first body, a second body, a spring, a guide rail seat and a guide pin. The first body is a hollow body with a first linking port and a first assembly port. The first linking port serves for the first section of rod body to be sleeved with one end of the grip, and the first assembly port is assembled with the second body. The second body is a hollow body with a second connecting port and a second assembly port, the second connecting port is connected with one end of the second section of rod body opposite to the joint member, and the second assembly port is connected with the first assembly port of the first body. The guide rail seat is arranged on the second assembly port, and is arranged with a guide rail, a positioning groove, and at least one assembly notch. The guide rail has a position for guiding the first section of rod body to rotate 180 degrees from a position to be ground; the positioning groove is arranged on the position the guide rail where the first section of rod body is ground, and the assembly notch is arranged near the positioning groove. The guide pin is assembled on the end of the first section of rod body opposite to one end of the grip, and allows the first section of rod body to rotate along the guide rail. The spring is assembled inside the first body and second body, and its two ends are respectively propped against the first rod body and second rod body, so that the first section of rod body provides a restoring force to be positioned in the positioning groove after rotating.

In this way, when using the above structure to store, the first section of rod body is separated from the positioning groove, and the guide pin moves along the guide rail, so that the grip of the first section of rod body is moved to the same direction corresponding to the joint member of the second section of rod body, and the volume is be shortened, which is beneficial to storing in a small area.

According to the above, the second assembly port of the second body is connected with the first assembly port of the first body, and the guide rail seat on the second body is arranged with an external thread; the first body is oppositely arranged with an internal thread, and the first body and the second body are assembled as a whole by the internal thread and the external thread.

According to the above, before the first body is screwed to the second body, the guide pin is screwed to the pin hole at one end of the first section of rod body, and one end of the guide pin enters the guide rail along the assembly notch, and then the first body is screwed to the second body, so that the first section of rod body can be folded, rotated and positioned by the movement of the guide pin in the guide rail.

According to the above, one end of the second section of rod body of the crank rocker is connected with the second connecting port of the second body, one end of the second section of rod body is arranged with a fixing hole, while the second body is oppositely arranged with an assembly hole, and the second section of rod body of the crank rocker is fixed to the fixing hole through the assembly hole by a fixing column, so that one end of the second section of rod body of the crank rocker is integrated with the second body.

DETAILED DESCRIPTION OF THE INVENTION

Figure 8:
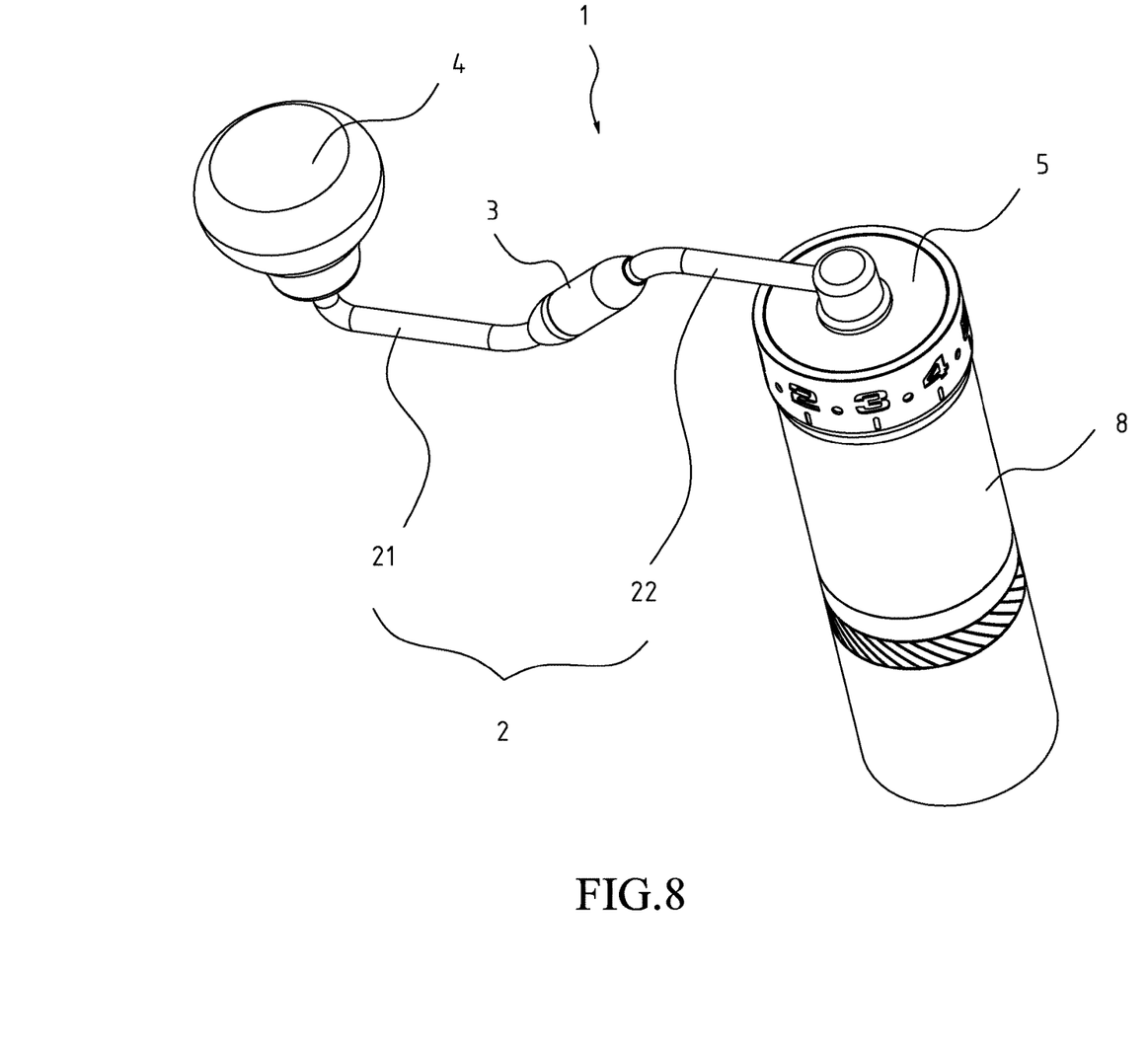
FIG. 8 and FIG. 9 are diagrams respectively illustrating the rocker arm of the hand-operated bean grinder of the present invention assembled on different kinds of bean grinders according to two embodiments.
Figure 9:
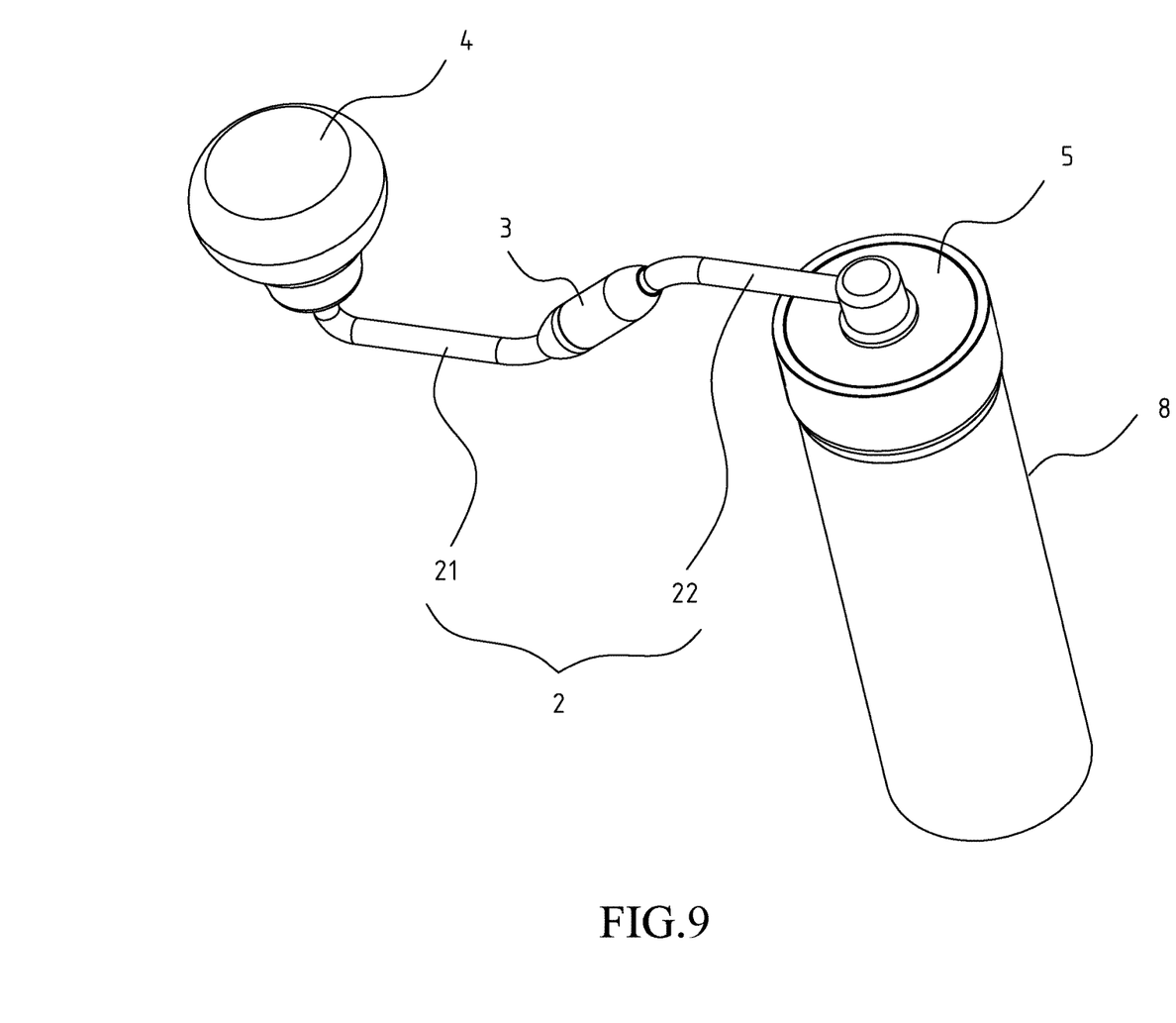

Please refer to FIG. 8 and FIG. 9. A folding mechanism 3 is arranged in the middle of the crank rocker 2 of the rocker arm structure 1 of the hand-operated bean grinder of the present invention. The crank rocker 2 is divided into a first section of rod body 21 and a second section of rod body 22. One end of the first section of rod body 21 is arranged with an assembled grip 4 for force assertion of manual grinding, and one end of the second section of rod body 22 is assembled with a joint cap (i.e., the joint member 5 described later, which is in the assembly form for different brands of the bean grinder 8) for manually grinding after being assembled with a bean grinder.

Please refer to FIGS. 1 to 4 for the exploded view, assembled view, side view and cross-sectional view of the rocker arm structure of the hand-operated bean grinder of the present invention. As shown in these figures, the rocker arm structure 1 of the hand-operated bean grinder of the present invention includes a crank rocker 2 and a folding mechanism 3, wherein the crank rocker 2 has a first section of rod body 21 and a second section of rod body 22. Please refer to FIGS. 1 and 4, one end 211 of the first section of rod body 21 is arranged with a guide column 212 for assembling with the grip 4. The grip 4 is arranged with an assembly hole 41, and an inner liner 42 is arranged in the assembly hole 41, so that the guide column 212 can be assembled with the grip 4 in a tightly fitted manner. One end 221 of the second section of rod body 22 is arranged with a riveting hole 222, and the joint member 5 is arranged with a riveting hole 50 corresponding to the riveting hole 222. The joint member 5 is locked to the second section of rod body 22 through a rivet 6.

Figure 1:
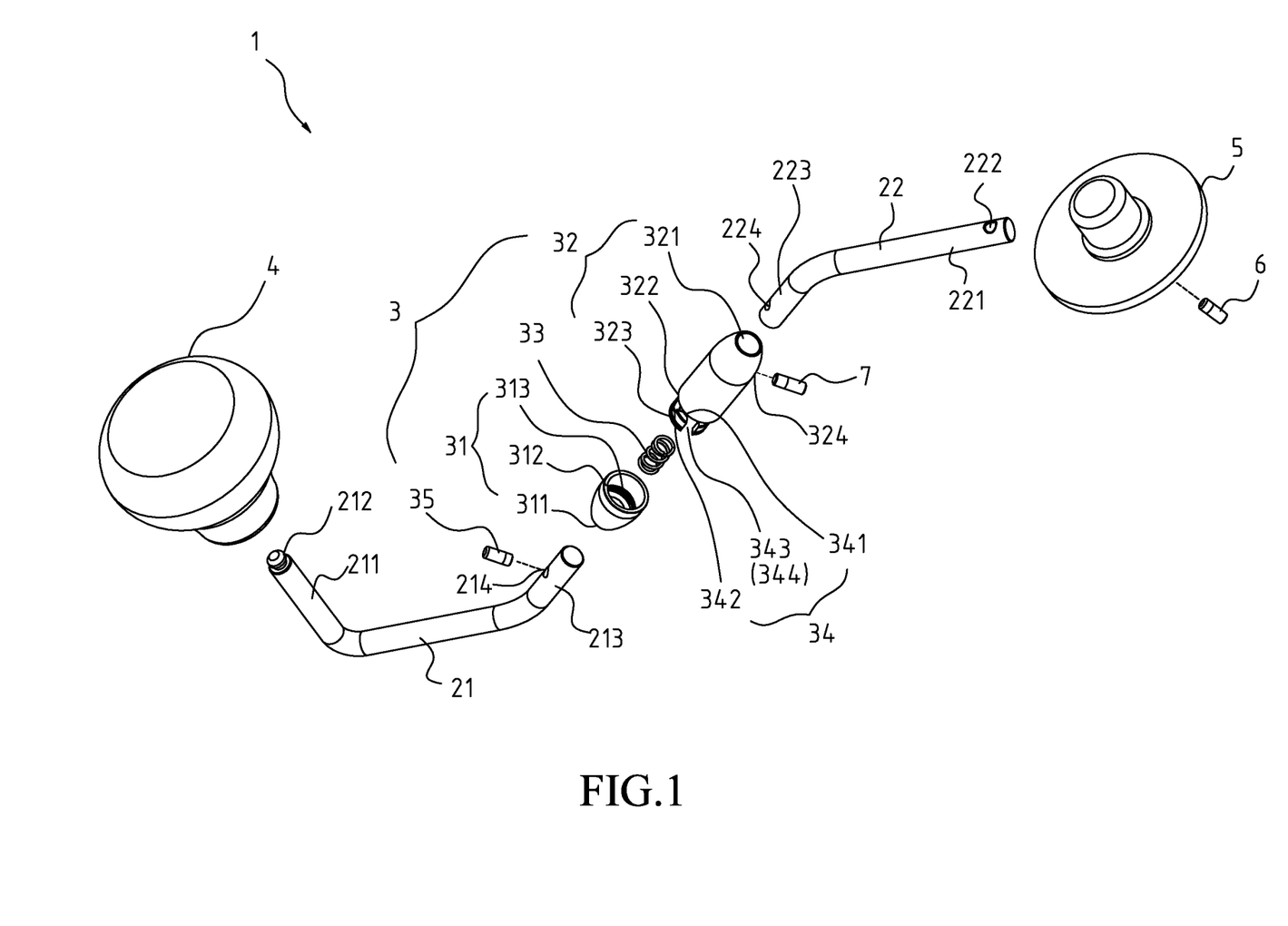
FIG. 1 is a diagram illustrating an exploded view of the rocker arm structure of the hand-operated bean grinder according to the present invention.
Figure 4:
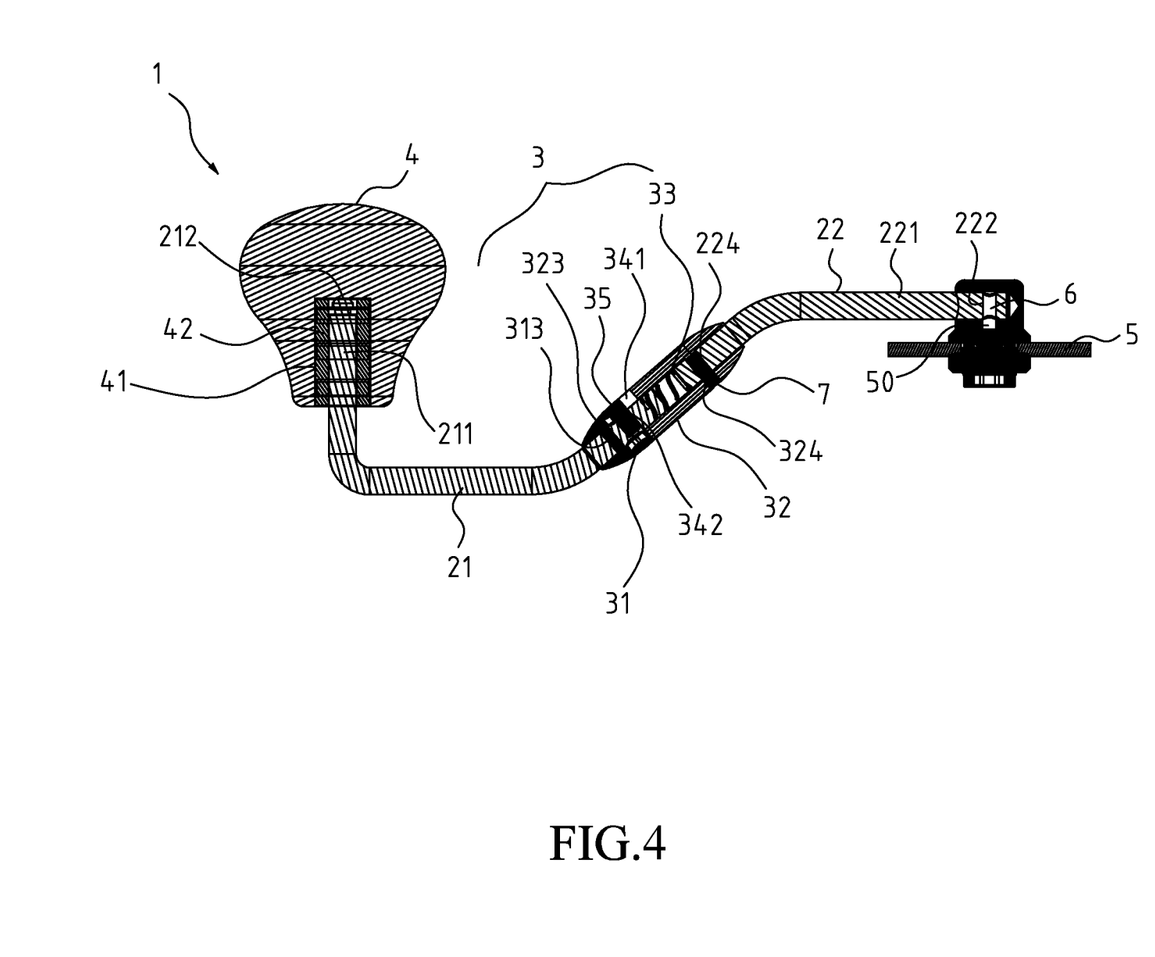
FIG. 4 is a diagram illustrating a cross-sectional view of the rocker arm structure of the hand-operated bean grinder of FIG. 3.

FIGS. 1 and 4, the folding mechanism 3 includes a first body 31, a second body 32, a spring 33, a guide rail seat 34 and a guide pin 35, wherein the first body 31 is a hollow body, and has a first linking port 311 and a first assembly port 312, the first linking port 311 is sleeved with the other end 213 of the first section of rod body 21, and the first assembly port 312 is connected with the first section of rod body 21. The first body 31 is arranged with an internal thread 313, and the first body 31 and the second body 32 are integrated by the internal thread 313 and the external thread 323. One thing to be noted that before the first body 31 is fastened to the second body 32, the guide pin 35 must be fastened to the pin hole 214 at one end 213 of the first section of rod body 21. After assembly, a part of the guide pin 35 is exposed outside the pin hole 214, and the exposed guide pin 35 can move along the guide rail 341 of the guide rail seat 34 (this part is described later). If the first body 31 is screwed to the second body 32 after the guide pin is assembled, one end 211 of the first section of rod body 21 would be fastened to the grip 4, and the other end 213 would be fastened to the guide pin 35, so that the rotating and positioning of the folding can be achieved with the aid of the movement on the guide rail 341.

The second body 32 is also a hollow body, and has a second connecting port 321 and a second assembly port 322. The second connecting port 321 is connected with one end 223 of the second section of rod body 22, that is, a fixing hole 224 is arranged at one end 223 of the second section of rod body 22, and an assembly hole 324 is arranged opposite to the second body 32, and the assembly hole 324 is fixed to the fixing hole 224 through the fixing column 7. As mentioned above, the second assembly port 322 and the first assembly port 312 of the first body 31 connect the first body 31 and the second body 32 through the internal thread 313 of the first body 31 and the external thread 323 of the guide rail seat 34. In this way, one end 221 of the second section of rod body 22 is assembled with the joint member 5, and the other end 223 is assembled with the second body 32.

The spring 33 is assembled in the first body 31 and the second body 32, which is implemented with a compression spring, and its two ends are respectively abutted against one end 213 of the first rod body 21 and one end 223 of the second rod body 22, thereby making the first section of rod body 21 provide restoring force after rotating.

Figure 5A:
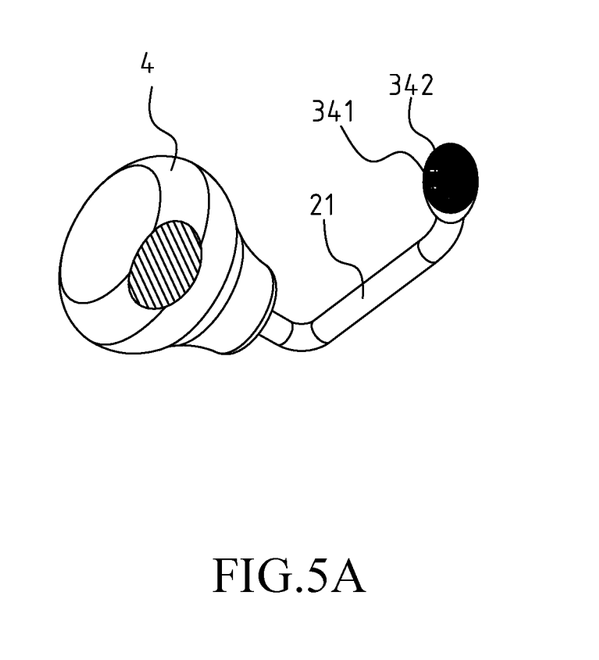
FIGS. 5A to 5C are diagrams respectively illustrating partial cross-sectional views of the movements of the rocker arm of the hand-operated bean grinder along the guide rail during folding.
Figure 5B:
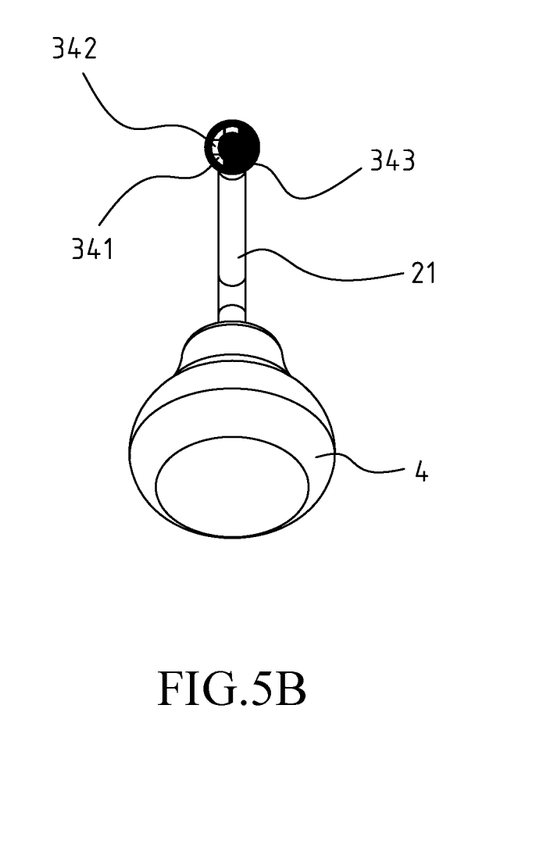
Figure 5C:
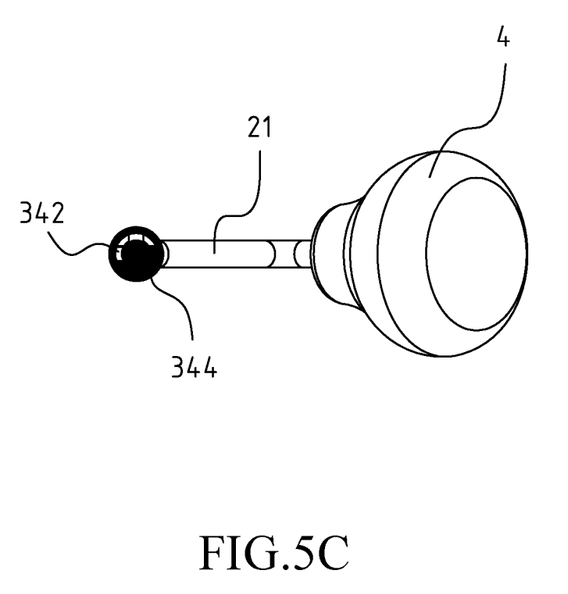

As shown in FIG. 1, FIG. 4 and FIGS. 5A to 5C, the guide rail seat 34 is in the shape of an axial column and arranged on the second assembly port 322 of the second body 32, and has a guide rail 341, a positioning groove 342, and two assembly notches 343, 344 (see FIGS. 1, 5B and 5C). The guide rail 341 is arranged surrounding the circumference of the axial column guide rail seat 34, and is positioned to guide the first section of rod body 21 to rotate 180 degrees from the position to be ground (as shown in FIGS. 5B and 5C). The positioning groove 342 is arranged on the guide rail 341 with a concave groove (as shown in FIG. 1), and is arranged on the guide rail 341 where the first section of rod body 21 is in the position to be ground (as shown in FIG. 5A). The assembly notches 343, 344 are tied to the guide rail 341 in 90, 180 degrees from the positioning groove 342. As mentioned above, the guide pin 35 is fixed on the end edge of one end 213 of the first section of rod body 21, and can rotate the first section of rod body 21 along the guide rail 341.

Figure 2:
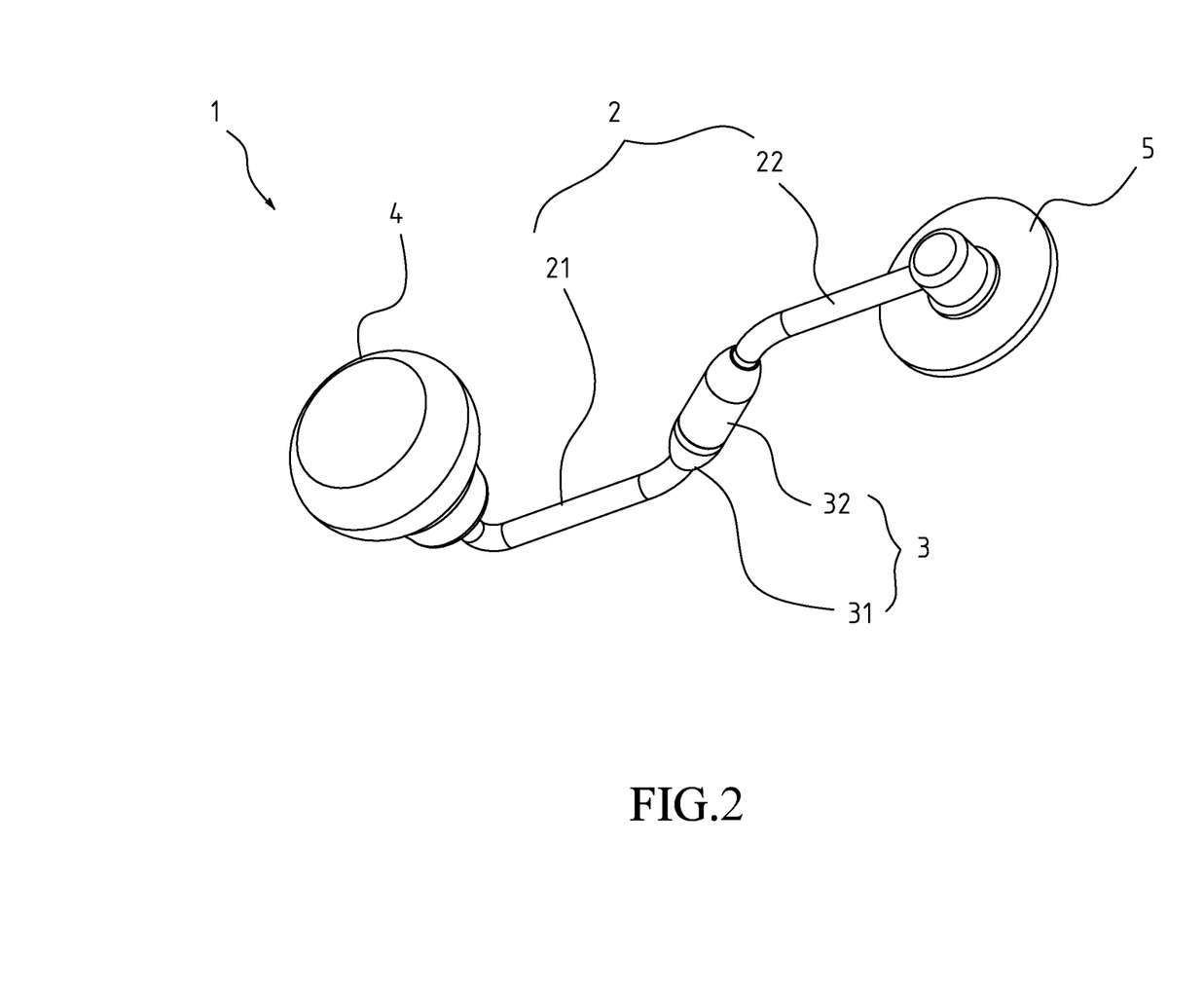
FIG. 2 and FIG. 3 are diagrams respectively illustrating a stereo view and side view of the rocker arm structure of the hand-operated bean grinder of FIG. 1.
Figure 3:
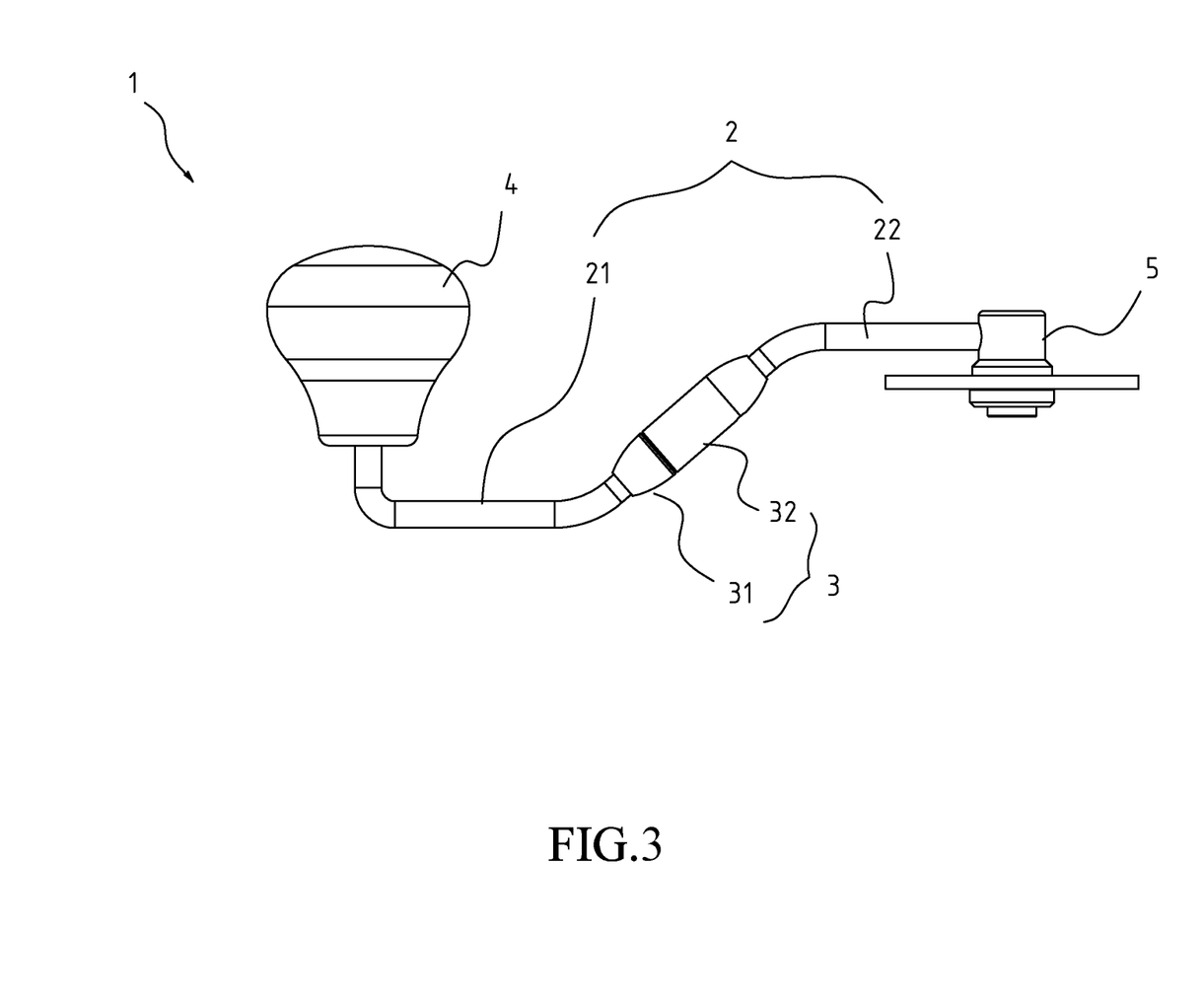
Figure 6:
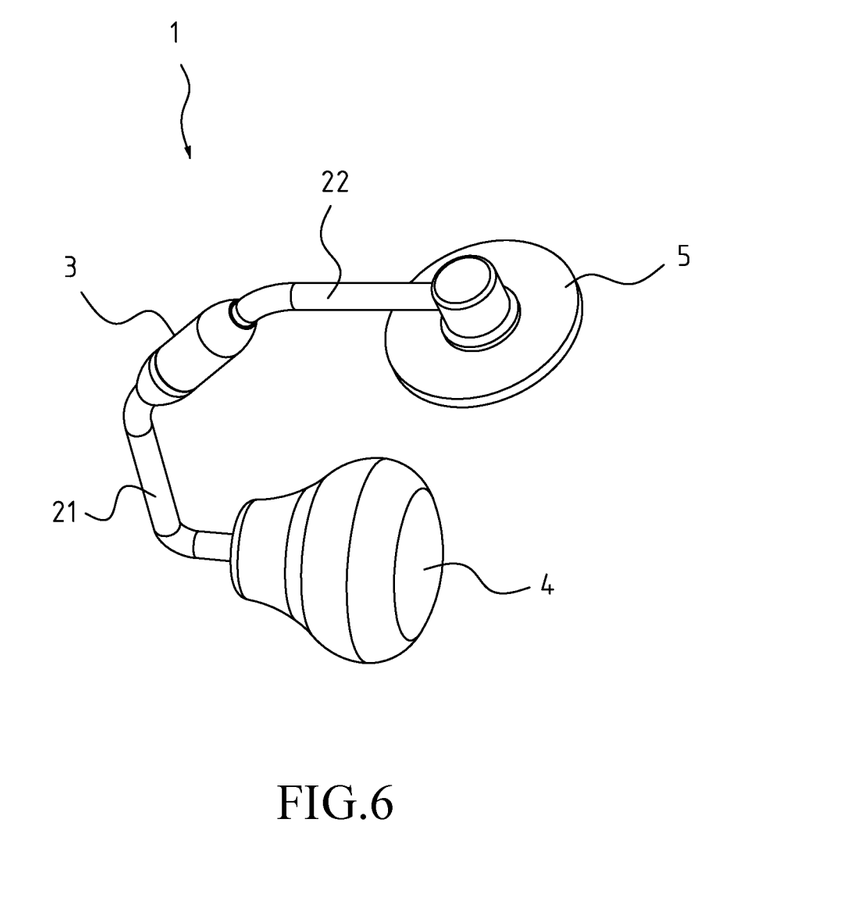
FIG. 6 and FIG. 7 are diagrams respectively illustrating a stereo view and a side view of the rocker arm of the hand-operated bean grinder of the present invention after folding.
Figure 7:
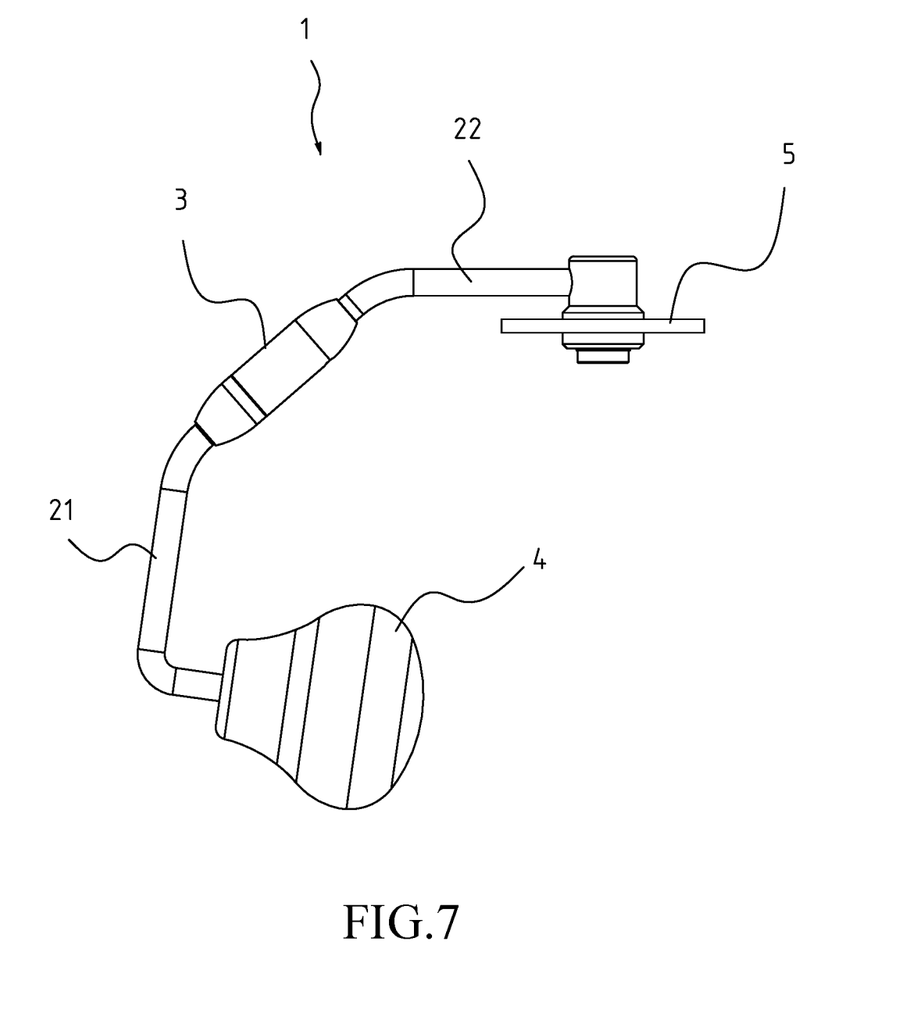

After the rocker arm structure 1 of the hand-operated bean grinder of the present invention is assembled with the above structure as shown in FIGS. 2 and 3, the volume of the whole crank rocker 2 plus the joint member 5 and the grip 4 is longer and narrower, and the asymmetrical shapes in different directions make the overall shape fluctuate. When storing, please refer to FIGS. 4 and 5A to 5C. As long as the first section of rod body 21 is separated from the positioning groove 342, the first section of rod body 21 pushes the spring 33 to have a restoring energy. As shown in FIG. 4, the spring 33 is pressed to one side of the second section of rod body 22, so that the guide pin 35 is separated from the positioning groove 342 and moves along the guide rail 341 (as shown in FIGS. 5B and 5C). In this way, the grip 4 of the first section of rod body 21 can be moved to the same position corresponding to the joint member 5 of the second section of rod body 22 (as shown in FIGS. 6 and 7), and the overall length can be shortened, which is beneficial to storing in a small area.

What is claimed is:

1. A rocker arm structure of a hand-operated bean grinder comprising a crank rocker and a folding mechanism, wherein:

the crank rocker comprises a first section of rod body and a second section of rod body, one end of the first section of rod body is assembled with a grip, and one end of the second section of rod body is assembled with a joint member; and the folding mechanism comprises a first body, a second body, a spring, a guide rail seat and a guide pin, wherein:

the first body is a hollow body with a first linking port and a first assembly port, wherein the first linking port serves for the first section of rod body to be sleeved with one end of the grip, and the first assembly port is assembled with the second body;

the second body is a hollow body with a second connecting port and a second assembly port, wherein the second connecting port is connected with one end of the second section of rod body opposite to the joint member, and the second assembly port is connected with the first assembly port of the first body;

the guide rail seat is arranged on the second assembly port, and is arranged with a guide rail, a positioning groove, and at least one assembly notch, wherein the guide rail has a position for guiding the first section of rod body to rotate 180 degrees from a position to be ground; the positioning groove is arranged on the position the guide rail where the first section of rod body is ground, and the assembly notch is arranged near the positioning groove;

the guide pin is assembled on the end of the first section of rod body of the crank rocker opposite to one end of the grip, and allows a part of the guide pin to rotate along the guide rail of the guide rail seat result in a rotating of the first section of rod body;

the spring is assembled inside the first body and second body, and two ends of the spring are respectively propped against the first section of rod body and the second section of rod body, so that the first section of rod body provides a restoring force to be positioned in the positioning groove after rotating; and when storing, the first section of rod body is separated from the positioning groove, and the part of the guide pin moves along the guide rail of the guide rail seat, so that the grip of the first section of rod body is moved to corresponding to the joint member of the second section of rod body.

2. The rocker arm structure of the hand-operated bean grinder according to claim 1, wherein the second assembly port of the second body is connected with the first assembly port of the first body, and the guide rail seat on the second body is arranged with an external thread; the first body is oppositely arranged with an internal thread, and the first body and the second body are assembled as a whole by the internal thread and the external thread.

3. The rocker arm structure of the hand-operated bean grinder according to claim 1, wherein the guide pin is assembled on the first section of rod body of the crank rocker, and a pin hole is arranged at one end of the first section of rod body opposite to the grip, and a part of the guide pin is exposed outside the pin hole after assembly, so that the exposed guide pin can move along the guide rail.

4. The rocker arm structure of the hand-operated bean grinder according to claim 1, wherein one end of the second section of rod body of the crank rocker opposite to the joint member is connected with the second connecting port of the second body, a fixing hole is arranged at one end of the second section of rod body of the crank rocker opposite to the joint member, an assembly hole is arranged opposite to the second body, and the second section of rod body is fixed to the fixing hole by a fixing column, so that the second section of rod body of the crank rocker is assembled with the second body.

5. The rocker arm structure of the hand-operated bean grinder according to claim 1, wherein the guide rail seat is in a shape of a shaft column, and the guide rail is arranged around a circumferential surface of the shaft column.

6. The rocker arm structure of the hand-operated bean grinder according to claim 5, wherein the positioning groove forms a concave groove on the guide rail.

7. The rocker arm structure of the hand-operated bean grinder according to claim 5, wherein the assembly notch have two that the one is tied to the guide rail in 90-degree, and the other one is tied to 180-degree from the positioning groove, providing a rotating and positioning of the folding of the crank rocker.

8. The rocker arm structure of the hand-operated bean grinder according to claim 1, wherein the spring is a compression spring.

9. The rocker arm structure of the hand-operated bean grinder according to claim 1, wherein one end of the first section of rod body of the crank rocker is assembled with the grip, and a guide column is arranged at one end of the first section of rod body opposite to the guide pin, and an assembly hole is arranged on the grip, and a lining is arranged in the assembly hole, so that the guide column is assembled with the grip in a tightly fitted manner.

10. The rocker arm structure of the hand-operated bean grinder according to claim 1, wherein one end of the second section of rod body of the crank rocker opposite to the fixing column is connected with the joint member, a riveting hole is arranged at one end of the second section of rod body opposite to the fixing column, and the joint member is arranged with another riveting hole corresponding to the riveting hole, and the joint cap is locked on one end of the second section of rod body opposite to the fixing column by a rivet.

* * * * *